(12) United States Patent
Brown

(10) Patent No.: US 6,543,829 B2
(45) Date of Patent: Apr. 8, 2003

(54) BI-FOLD BOX DOOR SYSTEM

(76) Inventor: Donald D. Brown, 10129 W. Rose La., Glendale, AZ (US) 85307

( * ) Notice: Subject to any disclaimer, the term of this patent is extended or adjusted under 35 U.S.C. 154(b) by 0 days.

(21) Appl. No.: 09/772,727

(22) Filed: Jan. 30, 2001

(65) Prior Publication Data

US 2002/0101089 A1 Aug. 1, 2002

(51) Int. Cl.$^7$ .................................................. B60J 1/18
(52) U.S. Cl. .................. 296/37.6; 160/213; 296/146.13
(58) Field of Search .............................. 296/37.6, 37.5, 296/146.12, 146.8, 146.13; 160/210, 213, 207

(56) References Cited

U.S. PATENT DOCUMENTS 2,113,291 A  * 4/1938 Clark et al.
4,184,709 A  * 1/1980 Kim
5,601,131 A  * 2/1997 Morris ......................... 160/207
5,992,918 A  * 11/1999 Gobart et al. ........... 296/146.13
6,068,327 A  * 5/2000 Junginger ............... 296/146.13

FOREIGN PATENT DOCUMENTS

JP        2-171319      * 2/1990

* cited by examiner

*Primary Examiner*—Joseph D. Pape
(74) *Attorney, Agent, or Firm*—Martin L. Stoneman

(57) ABSTRACT

A utility box, of the type found on utility trucks, having a vertically-openable door which stores by resting on the top of the utility box. The door has as upper segment and a lower segment connected by a first hinge; and the upper segment is connected to the utility box top by a second hinge. The lower segment is about twice the height of the upper segment. Because of this construction, the door may be opened and closed nearby another vehicle or structure, since the maximum horizontal extension needed (from the box) to operate the door is about the same as the height of the smaller upper door segment.

20 Claims, 2 Drawing Sheets

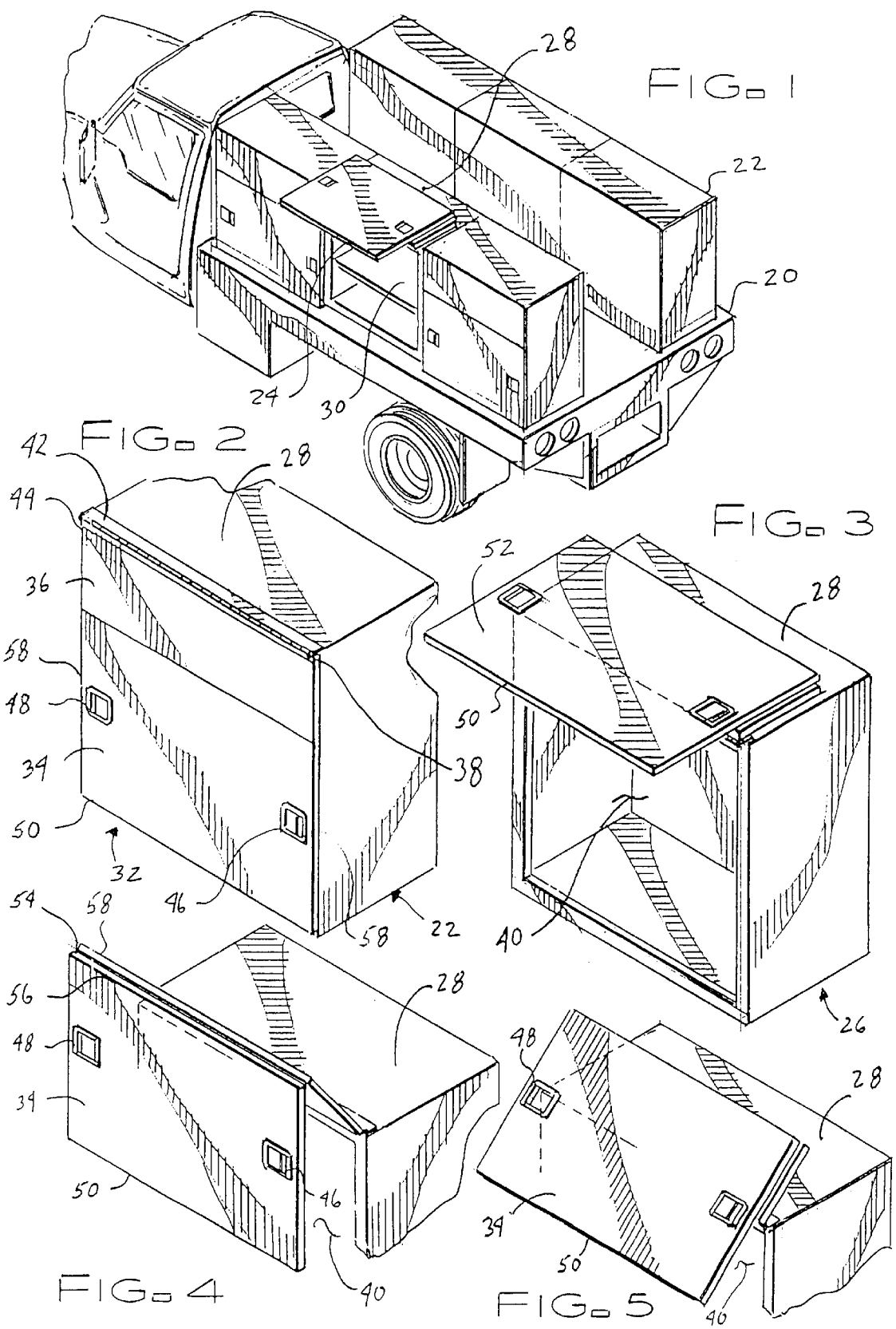

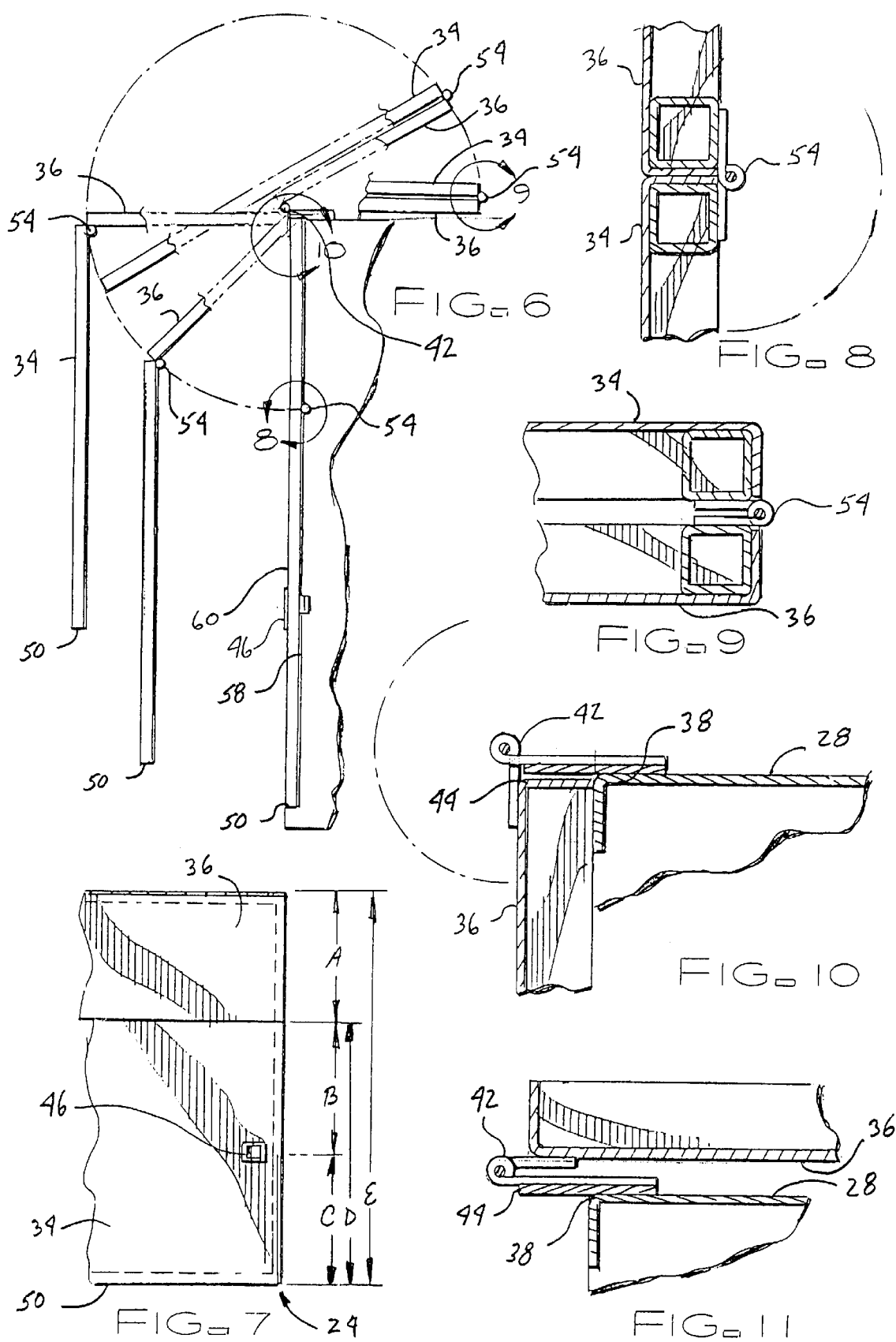

BI-FOLD BOX DOOR SYSTEM

BACKGROUND

This invention relates to providing a system for improved utility box doors. Typically, utility box doors, such as those for tool boxes on trucks, either swivel outwards, roll-up, or lift-up in a single panel. These types of doors each have innate disadvantages. Swivel doors tend to occupy a large amount of space, depending on the size of the door and direction of the door swing. They are not, generally, weight-balanced, and tend to swing open in a large radius or arc. Roll-up and lift-up doors generally open up by the use of complicated rollers, tracking systems and counterweight measures. These doors are heavy and typically open inward along the top portion of the inside of the utility box, thereby occupying valuable space. Other types of door closures are known, such as horizontally-opening doors, e.g., accordion doors which open or fold inward or outward. Horizontally opening doors generally require more space, lessening the width of the utility box door opening, which may be used for ingress or egress.

OBJECTS OF THE INVENTION

A primary object and feature of the present invention is to provide a system for a box door in which the door requires a minimum amount of space in front of the door to be opened and closed. Another object and feature of the present invention is to provide a system for a box door which raises and folds on top of itself by use of a piano-hinge-type connection. By constructing and proportioning the top part of the door about one-half as long as the bottom part, the door is "counter-balanced" for ease of raising and lowering and resting, say, on the top of the box.

It is a further object and feature of the present invention to provide a system for a box door that occupies a minimum amount of space within the cargo box and requires a minimum amount of space adjacent the box door for opening the door.

Yet another object and feature of the present invention is to provide such a system which is efficient, inexpensive, and handy. Other objects and features of this invention will become apparent with reference to the following descriptions.

SUMMARY OF THE INVENTION

According to a preferred embodiment of the present invention, there is provided a closable portal system, for a structure having a substantially horizontal surface adjacent the portal top and extending behind the portal, comprising, in combination: a normally substantially-planar door having a substantially-flat lower segment and a substantially-flat upper segment and being structured and arranged to close the portal; a fold system structured and arranged to fold such door between such two substantially-flat segments along a horizontal first axis substantially in such plane of such door and situate in an upper half of such door; and a rotatable connector, structured and arranged to rotate such door, situate along a horizontal second axis substantially in such plane of such door, situate substantially along a top of such door and located substantially in a plane of the substantially horizontal adjacent surface; wherein such closable portal is structured and arranged to be opened by a lifting of a bottom of such door to about a height of such top of such door; and wherein such door is structured and arranged so that, when such bottom is lifted to the plane of the substantially horizontal adjacent surface, such door is stably supported by the substantially horizontal adjacent surface.

Further, it provides such a system wherein such closable portal is structured and arranged so that, when such door is stably supported by the substantially horizontal adjacent surface, such closable portal may be closed by a lowering of such bottom of such door until such door is in a substantially planar condition. It also provides such a system further comprising a door-lock structured and arranged to assist locking of such door when such portal is closed; and, wherein such substantially-flat lower segment has a first height and such substantially-flat upper segment has a second height; and the magnitude of such first height is no more than about twice the magnitude of such second height.

Even further, it provides such a system wherein the magnitude of such first height is about twice the magnitude of such second height. And, it provides such a system wherein a ratio of such first height to such second height is set so as to achieve a balance between easiness of lowering such door by pulling down such bottom of such door; and a smallest maximum horizontal distance from a plane of such portal to which such door must extend when being closed or opened. It also provides such a system wherein the structure comprises a container and a top of the container comprises the portal top.

According to another preferred embodiment of the present invention, there is provided a vertically-openable-door system for a utility box, having a box top and an opening for a door, of the type typically used for transporting or storing, comprising, in combination: a first hinge and a second hinge; a first upper, smaller-height, door element, having a bottom and a top, hingedly connected by means of such first hinge to the top of the opening; and a second lower, larger-height, door element, having a bottom and a top, hingedly connected by means of such second hinge to the bottom of such first door element; wherein such first hinge, such second hinge and an arrangement of the hinged connection of such door elements are constructed and arranged so that such top of such upper door is rotatably moveable around such first hinge so that such upper door may be placed in a stable position on the box top and such lower door is rotatably moveable around such second hinge so that such upper door may be placed in a stable position on the box top with such bottom of such upper door extending forwardly of the utility box; wherein comparative heights of such smaller-height door and such larger-height door are structured and arranged so that, when such box door is open such bottom of such lower door remains a stable overhang and such bottom of such lower door may be easily pulled downward for closure by a single arm of a single user.

Additionally, it provides such a system wherein such top of such first upper door element is in about a plane of such box top. And, it provides such a system wherein such first hinge permits at least about 270 degrees of unidirectional rotation. Further, it provides such a system wherein such first hinge is external to the utility box. Also, it provides such a system wherein such second hinge permits at least about 180 degrees of unidirectional rotation. Even further, it provides such a system wherein such second hinge is internal to the utility box. And, it provides such a system wherein such first and second hinges comprise piano hinges. Also, it provides such a system further comprising a utility truck, wherein such utility box is attached to and carried by such utility truck.

Moreover, it provides such a system wherein comparative heights of such smaller-height door element and such larger-height door element are structured and arranged so as to achieve a balance between: easiness of lowering such door elements by pulling down such bottom of such lower door; and a smallest maximum horizontal distance from a plane of such opening to which such door elements must extend when closing or opening such opening.

According to yet another preferred embodiment of the present invention, there is provided a vertically-openable-door system for a utility box, having a box top and an opening for a door, of the type typically used for transporting or storing, comprising, in combination: a first hinge and a second hinge; a first upper, smaller-height, door element, having a bottom and a top, hingedly connected by means of such first hinge to the top of the opening; and a second lower, larger-height, door element, having a bottom and a top, hingedly connected by means of such second hinge to the bottom of such first door element; wherein such first hinge, such second hinge and an arrangement of the hinged connection of such door elements are constructed and arranged so that such top of such upper door is rotatably moveable around such first hinge so that such upper door may be placed in a stable position on the box top and such lower door is rotatably moveable around such second hinge so that such upper door may be placed in a stable position on the box top with such bottom of such upper door extending forwardly of the utility box; wherein comparative heights of such smaller-height door and such larger-height door are structured and arranged so that, when such box door is open such bottom of such lower door remains a stable overhang and such bottom of such lower door may be easily pulled downward for closure by a single arm of a single user; wherein such top of such first upper door element is in about a plane of such box top; wherein such first hinge permits at least about 270 degrees of unidirectional rotation; wherein such first hinge is external to the utility box; wherein such second hinge permits at least about 180 degrees of unidirectional rotation; and wherein such second hinge is internal to the utility box.

Further, it provides such a system wherein such first and second hinges comprise piano hinges. And, it provides such a system further comprising a utility truck, wherein such utility box is attached to and carried by such utility truck. Still further it provides such a system wherein comparative heights of such smaller-height door element and such larger-height door element are structured and arranged so as to achieve a balance between: easiness of lowering such door elements by pulling down such bottom of such lower door; and a smallest maximum horizontal distance from a plane of such opening to which such door elements must extend when closing or opening such opening.

BRIEF DESCRIPTION OF THE DRAWINGS

FIG. 1 is a perspective view of a vehicle with a utility box and a box door of the box door system according to a preferred embodiment of the present invention.

FIG. 2 is a perspective view of a utility box and a box door, in the closed position, of the box door system according to a preferred embodiment of the present invention.

FIG. 3 is a perspective view of a utility box and a box door, in the fully open position, of the box door system according to a preferred embodiment of the present invention.

FIG. 4 is a perspective view of a utility box door, in a partially open position, of the box door system according to a preferred embodiment of the present invention.

FIG. 5 is a perspective view of a utility box door, in a partially open position, of the box door system, according to a preferred embodiment of the present invention.

FIG. 6 is a side view, partially in section, of a utility box door of the box door system, according to a preferred embodiment of the present invention, illustrating the full range of motion of the box door.

FIG. 7 is a front view of a utility box door of the box door system according to a preferred embodiment of the present invention, illustrating the preferred door proportions.

FIG. 8 is a close-up view, partially in section, of the hinge position 8 illustrated in FIG. 6.

FIG. 9 is a close-up view, partially in section, of the hinge position 9 illustrated in FIG. 6.

FIG. 10 is a close-up view, partially in section, of the hinge position 10 illustrated in FIG. 6.

FIG. 11 is a close-up view, partially in section, illustrating the final position of the hinge position 10 in FIG. 6.

DETAILED DESCRIPTION OF A PREFERRED EMBODIMENT OF THE INVENTION

FIG. 1 is a perspective view of a vehicle 20 (embodying herein a utility truck) with an attached utility box 22 and a box door 24 (embodying herein a normally substantially-planar door having a substantially-flat lower segment and a substantially-flat upper segment and being structured and arranged to close the portal) of the box door system according to a preferred embodiment of the present invention. Vehicles such as vehicle 20, which utilize one or more utility boxes 22 to carry such cargo as merchandise, tools and other such equipment, are often in use in areas where, due to parking, there is little room to off-load the cargo. In the illustrated embodiment of the present invention, the box door 24 is shown in the stored position 26 (also illustrated in FIG. 3). The inventive manner of manufacturing the box door 24, in preferably one-third and two-third segmented sections, in combination with up to 360 degree rotatable hinges (first hinge 42 and second hinge 54), provides a box door 24 which lifts up easily. It also provides and requires minimal space requirements in front of the box door 24. In addition, the box door 24 preferably rests on top 28 of the utility box 22 in such a manner as to allow maximum use of the utility box cargo area 30. It should be understood that the illustrated embodiment is in no means intended to limit the use of the box door 24 and may, in fact, be utilized on many different openings. These and other objects and features of the present invention will now be described in greater detail.

FIG. 2 is a perspective view of a utility box 22 and a box door 24 in the closed position 32. Preferably, the box door 24 is split into a lower first section 34 and an upper second section 36 (embodying herein such substantially-flat lower segment has a first height and such substantially-flat upper segment has a second height). The lower first section 34 is preferably comprised of two-thirds of the total height of the box door 24. The upper second section 36 is preferably comprised of one-third of the total height of the-box door 24 or about one-half the size of the lower first section 34 (the above arrangement embodying herein the magnitude of such first height is no more than about twice the magnitude of such second height). Preferably, upper section 36 is connected to the utility box 22 along the top 28 of the portal 40 (shown in FIG. 3 and embodying herein wherein the structure comprises a container and a top of the container comprises the portal top) by a first hinge 42 (embodying herein a first upper, smaller-height, door element, having a bottom and a top, hingedly connected by means of such first hinge to the top of the opening). Preferably, first hinge 42 is a piano-type hinge which extends along the entire upper edge 44 of the upper second section 36, as shown (this arrangement embodying herein a rotatable connector, structured and arranged to rotate such door, situate along a horizontal second axis; substantially in such plane of such door, situate substantially along a top of such door and located substantially in a plane of the substantially horizontal adjacent surface). Preferably, first hinge 42 will rotate 360 degrees, but, at least 270 degrees (embodying herein wherein such first hinge permits at least about 270 degrees of unidirectional rotation), thereby allowing the folding of upper second section 36 onto the top 28 of the utility box 22. The first hinge 42 is located such that it is external to the utility box, as shown (embodying herein wherein such first hinge is external.to the utility box). Two door latches 46 and 48 (embodying herein a door-lock structured and arranged to assist locking of such door when such portal is closed) are preferably placed adjacent the vertical edge 58 of the lower first section 34, approximately centered, such that the door latches 46 and 48 are about one-third upward from the bottom 50 of the lower first section 34, as shown. Preferably, the described placement of the door latches 46 and 48 allows for the most secure latching of the box door 24 to the utility box 22.

FIG. 3 is a perspective view of a utility box 22 and a box door 24, in the fully open position 26. As illustrated in FIG. 3, the box door 24 rests on the top 28 of the utility box 22 in such a manner as to allow maximum use of the utility box cargo area 30. In addition, the box door 24 folds such that in the illustrated open position 26, the box door 24 overhangs the portal 40. Preferably, the overhang portion 52 is about one-third of the total box door 24, or about one-half of the lower first section 34. This arrangement provides a stable position for the box door 24 on the top 28, and a weather overhang for the utility box 22 cargo (this arrangement embodying herein wherein such door is structured and arranged so that, when such bottom is lifted to the plane of the substantially horizontal adjacent surface, such door is stably supported by the substantially horizontal adjacent surface). Preferably closing the box door 22 from this open position is easily accomplished and occurs by simply lowering the box door 22 (embodying herein wherein such closable portal is structured and arranged so that, when such door is stably supported by the substantially horizontal adjacent surface, such closable portal may be closed by a lowering of such bottom of such door until such door is in a substantially planar condition).

The lifting and the mechanics of the preferred embodiment of the box door 24 is further illustrated in FIG. 4 through FIG. 6, and is described below. FIG. 4 illustrates the box door 24 in a partially open position, as would occur during the lifting of the box door 24. FIG. 4 also illustrates the second hinge 54, which connects the lower first section 34 and the upper second section 36. Preferably, second hinge 54 is a piano-type hinge. Preferably, second hinge 54 is attached to, and extends along, the top horizontal edge 56 of lower first section 34 and the bottom horizontal edge 58 of upper second section 36 (embodying herein a fold system structured and arranged to fold such door between such two substantially-flat segments along a horizontal first axis substantially in such plane of such door and situate in an upper half of such door). Preferably the second hinge 54 is situated internally such that it is on the inside of the utility box 22 (embodying herein wherein such second hinge is internal to the utility box). Preferably, second hinge 54 will rotate at least 180 degrees (embodying herein wherein such second hinge permits at least about 180 degrees of unidirectional rotation), thereby allowing the folding of the lower first section 34 onto the upper second section 36, wherein about one-half of the lower first section 34 extends forward of the utility box 22, as shown (embodying herein such lower door is rotatably moveable around such second hinge so that such upper door may be placed in a stable position on the box top with such bottom of such upper door extending forwardly of the utility box). This arrangement is further illustrated incrementally in FIG. 4, then FIG. 5, and in a final stable resting position on top 28 of the utility box 22 in FIG. 3 (embodying herein wherein such door is structured and arranged so that, when such bottom is lifted to the plane of the substantially horizontal adjacent surface, such door is stably supported by the substantially horizontal adjacent surface). This resting position as shown in FIG. 5 is accomplished by lifting the box door 24 to about the height of the upper edge 44 of the box door 24 (embodying herein wherein such closable portal is structured and arranged to be opened by a lifting of a bottom of such door to about a height of such top of such door). The arrangement of second hinge 54 is also shown in FIG. 6 and again in FIGS. 8 and 9, which will be even further described below.

FIG. 5 also illustrates the box door 24 in a partially open position as the box door 24 would appear as it is continuing to be lifted to a fully open position 26. The folding of the lower first section 34 in a horizontally stacked position to the upper second section 36 is illustrated. Preferably, as the lifting of the box door 24 continues, both the lower first section 34 and the upper second section 36 fold along the first hinge 42, as shown. Preferably, as the lifting motion continues, the entire lower first section 34 and folded upper second section 36 continues to rotate together along first hinge 42, approximately 270 degrees, as shown, until the entire assembly (both the lower first section 34 and folded upper second section 36) rests stably on the top 28 of the utility box 22 (this arrangement embodies herein wherein such first hinge, such second hinge and an arrangement of the hinged connection of such door elements are constructed and arranged so that such top of such upper door is rotatably moveable around such first hinge so that such upper door may be placed in a stable position on the box top and such lower door is rotatably moveable around such second hinge so that such upper door may be placed in a stable position on the box top with such bottom of such upper door extending forwardly of the utility box). Due to the box door 24 segmentation in one-third and two-third increments, in combination with the layout and hinge locations, the box door 24 is weight-balanced and preferably may be both easily lifted-up and closed with only one hand by a user (embodying herein wherein comparative heights of such smaller-height door and such larger-height door are structured and arranged so that, when such box door is open such bottom of such lower door remains a stable overhang and such bottom of such lower door may be easily pulled downward for closure by a single arm of a single user; and embodying herein wherein a ratio of such first height to such second height is set so as to achieve a balance between easiness of lowering such door by pulling down such bottom of such door).

FIG. 6 illustrates the full range of motion of a preferred embodiment of the box door 24 as the box door 24 is preferably being lifted by a user. As shown in FIG. 6, the distance required in front 60 of the box door 24 to clear any obstacles is about the distance of upper second section 36, which is about one-third the total height of the box door 24 (the above arrangement embodying herein a smallest maximum horizontal distance from a plane of such portal to which such door must extend when being closed or opened). This minimal space allows for easy access to the utility box (or any such portal) in spaces where the accessible space in front of the portal 40 may be limited (this distance is also described in FIG. 7 below as dimension A). The rotation of first hinge 42 is represented and further illustrated in FIGS. 10 and 11. The rotation of second hinge 54 is represented and further illustrated by FIGS. 8 and 9.

FIG. 7 is a front view of an embodiment of a utility box door 24 illustrating the preferred door proportions. Preferably, dimension A is equal to dimension B. Preferably, dimension B is equal to dimension C. Preferably, dimension A is one-half of dimension D. In other words, dimension A, dimension B and dimension C, preferably, each represent one-third of the total height E of the box door 24.

FIG. 8 is a close-up view, partially in section, of the hinge position 8 illustrated in FIG. 6. FIG. 8 illustrates the second hinge 54 as it would preferably appear when the box door 24 is in the closed position 22 (see FIG. 2 and FIG. 6).

FIG. 9 is a close-up view, partially in section, of the hinge position 9 illustrated in FIG. 6. FIG. 9 further illustrates the second hinge 54 as it would preferably appear when the box door 24 is in the open position 26 (see FIG. 3 and FIG. 6).

FIG. 10 is a close-up view, partially in section, of the hinge position 10 illustrated in FIG. 6. FIG. 10 further illustrates the first hinge 42 as it would preferably appear when the box door 24 is in the closed position 22 (see FIG. 2 and FIG. 6).

FIG. 11 is a close-up view, partially in section, illustrating the final position of the hinge position 10 in FIG. 6. FIG. 11 further illustrates the first hinge 42 as it would preferably appear when the box door 24 is in the open position 26 (see FIG. 3 and FIG. 6) and rotated onto the top 28 of the utility box 22.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A closable portal system, for a structure having a portal comprising a substantially horizontal surface adjacent a portal top and extending behind the portal, comprising, in combination:
   a) a normally substantially-planar door having a substantially-flat lower segment and a substantially-flat upper segment and being structured and arranged to close the portal;
   b) A fold system structured and arranged to fold said door between said two substantially-flat segments along a horizontal first axis
      i) substantially in a plane of said door and
      ii) situated in an upper half of said door; and
   c) a rotatable connector, structured and arranged to rotate said door, situated along a horizontal second axis
      i) substantially in a plane of said door,
      ii) situated substantially along a top of said door and
      iii) located substantially in a plane of the substantially horizontal adjacent surfacer,
   d) wherein said door is structured and arranged to be opened by a lifting of a bottom of said door to about a height of said top of said door; and
   e) wherein said door is structured and arranged so that, when said bottom is lifted to the plane of the substantially horizontal adjacent surface, said door is stably supported by the substantially horizontal adjacent surface.

2. The closable portal system of claim 1 wherein said door is structured and arranged so that, when said door is stably supported by the substantially horizontal adjacent surface, said door may be closed by a lowering of said bottom of said door until said door is in a substantially planar condition.

3. The closable portal system of claim 2 further comprising a door-lock structured and arranged to assist locking of said door when said portal is closed.

4. The closable portal system of claim 2 wherein:
   a) said substantially-flat lower segment has a first height and said substantially-flat upper segment has a second height ; and
   b) the magnitude of said first height is no more than about twice the magnitude of said second height.

5. The closable portal system of claim 4 wherein the magnitude of said first height is about twice the magnitude of said second height.

6. The closable portal system of claim 4 wherein a ratio of said first height to said second height is set so as to achieve a balance between:
   a) ease of pulling said door down by a user pulling down said bottom of said door; and
   b) a smallest maximum horizontal distance from a plane of said portal to which said door must extend when being closed or opened.

7. The closable portal system of claim 1 wherein the structure comprises a container and a top of the container comprises the portal top.

8. A vertically-openable-door system for a utility box, having a box top and an opening for a door, of the type typically used for transporting or storing, comprising, in combination:
   a) a first hinge and a second hinge;
   b) a first upper, smaller-height, door element, having a bottom and a top, hingedly connected by means of said first hinge to the top of the opening; and
   c) a second lower, larger-height, door element, having a bottom and a top, hingedly connected by means of said second hinge to the bottom of said first door element;
   d) wherein said first hinge, said second hinge and an arrangement of the hinged connection of said door elements are constructed and arranged so that
      i) said top of said upper door is rotatably moveable around said first hinge so that said upper door may be placed in a stable position on the box top and
      ii) said lower door is rotatably moveable around said second hinge so that said upper door may be placed in a stable position on the box top with said bottom of said upper door extending forwardly of the utility box;
   e) wherein comparative heights of said smaller-height door and said larger-height door are structured and arranged so that, when said box door is open
      i) said bottom of said lower door remains a stable overhang and
      ii) said bottom of said lower door may be easily pulled downward for closure by a single arm of a single user.

9. The vertically-openable-door system according to claim 8 wherein said top of said first upper door element is in about a same plane of said box top.

10. The vertically-openable-door system according to claim 9 wherein said first hinge permits at least about 270 degrees of unidirectional rotation.

11. The vertically-openable-door system according to claim 10 wherein said first hinge is external to the utility box.

12. The vertically-openable-door system according to claim 9 wherein said second hinge permits at least about 180 degrees of unidirectional rotation.

13. The vertically-openable-door system according to claim 12, wherein said second hinge is internal to the utility box.

14. The vertically-openable-door system according to claim 9 wherein said first and second hinges comprise piano hinges.

15. The vertically-openable-door system according to claim 9 further comprising a utility truck, wherein said utility box is attached to and carried by said utility truck.

16. The vertically-openable-door system according to claim 9 wherein comparative heights of said smaller-height door element and said larger-height door element are structured and arranged so as to achieve a balance between:
 a) ease of pulling said door down by a user said door elements by pulling down said bottom of said lower door; and
 b) a smallest maximum horizontal distance from a plane of said opening to which said door elements must extend when closing or opening said opening.

17. A vertically-openable-door system for a utility box, having a box top and an opening for a door, of the type typically used for transporting or storing, comprising, in combination:
 a) a first hinge and a second hinge;
 b) a first upper, smaller-height, door element, having a bottom and a top, hingedly connected by means of said first hinge to the top of the opening; and
 c) a second lower, larger-height, door element, having a bottom and a top, hingedly connected by means of said second hinge to the bottom of said first door element;
 d) wherein said first hinge, said second hinge and an arrangement of the hinged connection of said door elements are constructed and arranged so that
  i) said top of said upper door is rotatably moveable around said first hinge so that said upper door may be placed in a stable position on the box top and
  ii) said lower door is rotatably moveable around said second hinge so that said upper door may be placed in a stable position on the box top with said bottom of said upper door extending forwardly of the utility box.

18. The vertically-openable-door system according to claim 17 wherein said first and second hinges comprise piano hinges.

19. The vertically-openable-door system according to claim 17 further comprising a utility truck, wherein said utility box is attached to and carried by said utility truck.

20. The vertically-openable-door system according to claim 17 wherein comparative heights of said smaller-height door element and said larger-height door element are structured and arranged so as to achieve a balance between:
 a) easiness of lowering said door elements by pulling down said bottom of said lower door; and
 b) a smallest maximum horizontal distance from a plane of said opening to which said door elements must extend when closing or opening said opening.

* * * * *